United States Patent
Sato et al.

(10) Patent No.: US 10,533,268 B2
(45) Date of Patent: Jan. 14, 2020

(54) SEALING MATERIAL COMPOSITION AND GLAND PACKING CONTAINING THE SEALING MATERIAL COMPOSITION

(71) Applicant: Nippon Pillar Packing Co., Ltd., Osaka (JP)

(72) Inventors: Kazuyoshi Sato, Osaka (JP); Kohei Arakawa, Osaka (JP); Ryoji Hamaguchi, Osaka (JP); Masaru Fujiwara, Osaka (JP); Hiroyoshi Nakamitsu, Osaka (JP)

(73) Assignee: Nippon Pillar Packing Co., Ltd., Osaka-shi (JP)

( * ) Notice: Subject to any disclaimer, the term of this patent is extended or adjusted under 35 U.S.C. 154(b) by 121 days.

(21) Appl. No.: 15/793,094

(22) Filed: Oct. 25, 2017

(65) Prior Publication Data

US 2018/0119316 A1     May 3, 2018

(30) Foreign Application Priority Data

Oct. 31, 2016  (JP) ................................. 2016-212846
Oct. 31, 2016  (JP) ................................. 2016-212847

(51) Int. Cl.
*D02G 3/44* (2006.01)
*D04B 21/20* (2006.01)
(Continued)

(52) U.S. Cl.
CPC ............. *D02G 3/447* (2013.01); *D04B 21/20* (2013.01); *D04C 3/12* (2013.01); *F16J 15/22* (2013.01);
(Continued)

(58) Field of Classification Search
CPC ... F16J 15/18; F16J 15/20; F16J 15/22; D10B 2505/06
(Continued)

(56) References Cited

U.S. PATENT DOCUMENTS 4,705,722 A * 11/1987 Ueda .................. F16J 15/20
                                                        277/537
5,134,030 A *  7/1992 Ueda .................. F16J 15/20
                                                        428/365

(Continued)

FOREIGN PATENT DOCUMENTS

JP       2007-138315       6/2007
JP       2007-191803       8/2007

*Primary Examiner* — Nicholas L Foster
(74) *Attorney, Agent, or Firm* — Oblon, McClelland, Maier & Neustadt, L.L.P.

(57) ABSTRACT

A sealing material composition which comprises sheet-like members containing expanded graphite, and which hardly causes the sheet-like members to be broken is provided.
A sealing material composition 1 comprises: a stacked body 5; and a long surrounding body 6 which surrounds the stacked body. The stacked body has a plurality of sheet-like members 10 each of which is formed into a tape-like shape by expanded graphite. In the stacked body, the plurality of sheet-like members are stacked in a direction which intersects with the longitudinal direction of the surrounding body, and, in the plurality of sheet-like members, sheet-like members which are adjacent to each other in the stacking direction are disposed to be displaced from each other in the longitudinal direction of the surrounding body, in a relatively movable manner. The surrounding body allows the adjacent sheet-like members to be relatively moved in the longitudinal direction of the surrounding body, while maintaining the stacked state of the adjacent sheet-like members.

15 Claims, 12 Drawing Sheets

(51) Int. Cl.
 *D04C 3/12* (2006.01)
 *F16J 15/22* (2006.01)
 *F16J 15/24* (2006.01)
 *D04B 1/22* (2006.01)

(52) U.S. Cl.
 CPC .............. *F16J 15/24* (2013.01); *D04B 1/225* (2013.01); *D10B 2505/06* (2013.01)

(58) Field of Classification Search
 USPC ....................................................... 277/537
 See application file for complete search history.

(56) References Cited

U.S. PATENT DOCUMENTS

| | | | | |
|---|---|---|---|---|
| 5,240,769 | A * | 8/1993 | Ueda ........................ | F16J 15/20 428/365 |
| 7,845,262 | B2 * | 12/2010 | Ueda ........................ | D04B 1/22 87/6 |
| 10,100,444 | B2 * | 10/2018 | Hamaguchi .............. | D07B 1/00 |
| 2009/0000264 | A1 * | 1/2009 | Ueda ........................ | D04B 1/22 57/328 |
| 2009/0108534 | A1 * | 4/2009 | Ueda ........................ | D04C 1/12 277/537 |
| 2017/0306535 | A1 * | 10/2017 | Hamaguchi .............. | D07B 1/00 |
| 2017/0321357 | A1 * | 11/2017 | Hamaguchi .............. | D07B 5/00 |

\* cited by examiner

|  | First round rod member (Diameter 10 mm) | Second round rod member (Diameter 30 mm) |
|---|---|---|
| Example 1 | ○ | ○ |
| Example 2 | ○ | ○ |
| Comparative Example 1 | × | × |

Fig. 7

| Component ratio [Mass%] | | Example 3 | Example 4 | Example 5 | Example 6 | Example 7 | Comparative Example 2 | Comparative Example 3 |
|---|---|---|---|---|---|---|---|---|
| | Inner core member | 5 | 20 | 30 | 50 | 70 | 4 | 71 |
| | Yarns | 95 | 80 | 70 | 50 | 30 | 96 | 29 |
| Leakage amount [Pa·m³/sec] | | $3 \times 10^{-8}$ | $3 \times 10^{-9}$ | $1 \times 10^{-9}$ | $5 \times 10^{-9}$ | $1 \times 10^{-7}$ | $4 \times 10^{-8}$ | $1 \times 10^{-4}$ |
| | | ○ | ○ | ○ | ○ | ○ | ○ | × |
| Remaining percentage of tightening force [%] | | 30 | 33 | 35 | 40 | 50 | 10 | 55 |
| | | ○ | ○ | ○ | ○ | ○ | × | ○ |

Fig. 12

SEALING MATERIAL COMPOSITION AND GLAND PACKING CONTAINING THE SEALING MATERIAL COMPOSITION

TECHNICAL FIELD

The present invention relates to a sealing material composition, and also to a gland packing containing the sealing material composition.

BACKGROUND ART

As a sealing material composition which is used for producing a sealing material, for example, known is a yarn which is disclosed in Patent Literature 1. A yarn of this kind is configured by a tubular member which is formed by knitting or braiding a fibrous material, and a plurality of fibrous members (fibrous expanded graphites) which are filled into the tubular member.

Each of the plurality of fibrous expanded graphites is a flexible long member. The fibrous expanded graphites are charged into the tubular member so that their longitudinal directions approximately coincide with the longitudinal direction of the tubular member, and then filled into the tubular member while being flexurally deformed, in a state where the fibrous expanded graphites are randomly arranged (see FIG. 6).

In the tubular member, therefore, uneven gaps are easily formed between adjacent ones of the plurality of fibrous expanded graphites. In a usual sealing material composition, consequently, such gaps are contained in a large number. Moreover, these gaps tend to exist at relatively short intervals in the longitudinal direction of the tubular member.

In the case where, for example, a sealing material is to be produced by using the yarn, or the yarn is to be conveyed while being wound around a round rod-like member such as a bobbin, when the yarn is flexed and curved, therefore, there is a case where the yarn is sharply bent in the curved portion, and one(s) of the plurality of fibrous expanded graphites is broken.

In such a yarn, when a bending action is applied by an external force, namely, a predetermined amount of flexure is allowed in accordance with the external force, but, when an external force greater than a permissible amount is applied, breakage may possibly occur in the plurality of fibrous expanded graphites. Therefore, there is a possibility that breakage in the plurality of fibrous expanded graphites may cause the performance of a sealing material which is produced by using the yarn, to be lowered.

Conventionally, a fluid apparatus such as a pump or a valve is provided with a gland packing as the above-described sealing material. A gland packing of this kind is configured by using an inner core member, and a plurality of yarns which are bundled around the inner core member in a state where the yarns are twisted or braided together (for example, see Patent Literature 2).

When the gland packing is to be used, the gland packing is firstly adjusted so as to have a predetermined longitudinal length. While maintaining the state, then, the gland packing is formed into a ring-like shape or compress-molded into a ring-like shape according to the shaft member of a predetermined fluid apparatus. Thereafter, the gland packing is stuffed and disposed into a stuffing box which is located in the periphery of the shaft member in the fluid apparatus.

In the gland packing, the inner core member is configured by the tubular member formed by knitting or braiding fibrous materials, and the plurality of fibrous expanded graphites filled into the tubular member. Therefore, there sometimes occurs a case where, when the gland packing is curved so as to exhibit a ring-like shape, the inner core member is sharply bent in the curved portion, and one(s) of the plurality of fibrous expanded graphites is broken.

In the inner core member, when a bending action is applied by an external force, namely, a predetermined amount of flexure is allowed in accordance with the external force, but, when an external force greater than a permissible amount is applied, breakage may possibly occur in the plurality of fibrous expanded graphites. Therefore, there is a fear that breakage in the plurality of fibrous expanded graphites may cause the sealing property of the inner core member and hence that of the gland packing, to be lowered.

PRIOR ART LITERATURE

Patent Literature

Patent Literature 1: Japanese Patent Application Laid-Open No. 2007-138315
Patent Literature 2: Japanese Patent Application Laid-Open No. 2007-191803

SUMMARY OF THE INVENTION

Problems to be Solved by the Invention

The invention has been conducted in view of these circumstances. It is an object of the invention to provide a sealing material composition which comprises sheet-like members containing expanded graphite, and which hardly causes the sheet-like members to be broken. It is another object of the invention to provide a gland packing in which the sealing property can be improved.

Means for Solving the Problems

The sealing material composition of the invention is a composition wherein
the composition comprises:
a stacked body; and
a long surrounding body which surrounds the stacked body,
the stacked body has
a plurality of sheet-like members each of which is formed into a tape-like shape by expanded graphite,
the plurality of sheet-like members are stacked in a direction which intersects with a longitudinal direction of the surrounding body,
in the plurality of sheet-like members, sheet-like members which are adjacent to each other in the stacking direction are disposed to be displaced from each other in the longitudinal direction of the surrounding body, in a relatively movable manner, and
the surrounding body allows
the adjacent sheet-like members to be relatively moved in the longitudinal direction of the surrounding body, while maintaining the stacked state of the adjacent sheet-like members.

In another mode of the sealing material composition of the invention,
each of the sheet-like members has:
one longitudinal end portion; another longitudinal end portion; and a longitudinal middle portion through which the one longitudinal end portion and the other longitudinal end portion are connected to each other, and the one longitudinal end portion is contacted with one side of the surrounding body, and the other longitudinal end portion is contacted with another side of the surrounding body, the one side and the other side being opposite to each other across the longitudinal middle portion.

In a further mode of the sealing material composition of the invention, the one and other longitudinal end portions of each of the sheet-like members are elongated in a direction which is inclined with respect to the longitudinal direction of the surrounding body.

In a still further mode of the sealing material composition of the invention, the longitudinal middle portion of each of the sheet-like members is disposed to be inclined with respect to the longitudinal direction of the surrounding body, and at least one of the one and other longitudinal end portions of the sheet-like member is disposed along the longitudinal direction of the surrounding body.

The gland packing of the invention contains the above-described sealing material composition.

In another mode of the gland packing of the invention, the gland packing comprises:

an inner core member in which the sealing material composition is used; and yarns which are disposed in a periphery of the inner core member in a state where the yarns are twisted or braided together.

In a further mode of the gland packing of the invention, the surrounding body of the sealing material composition is formed by metal wires, and each of the yarns comprises an expanded graphite material, and a reinforcing material which reinforces the expanded graphite material.

In a still further mode of the gland packing of the invention, the inner core member is 5 mass % or more and 70 mass % or less based on a total mass of the gland packing.

In a still further mode of the gland packing of the invention, the gland packing is formed by only the sealing material composition.

Effects of the Invention

According to the invention, it is possible to provide a sealing material composition containing expanded graphite, and which hardly causes the sheet-like members to be broken. According to the invention, furthermore, it is possible to provide a gland packing in which the sealing property can be improved.

BRIEF DESCRIPTION OF THE DRAWINGS

FIG. 7 is a view showing experimental results.

FIG. 12 is a view of results of experiments using the experimental apparatus of FIG. 11.

MODE FOR CARRYING OUT THE INVENTION

Firstly, an embodiment of the sealing material composition of the invention will be described with reference to the drawings.

Figure 1:
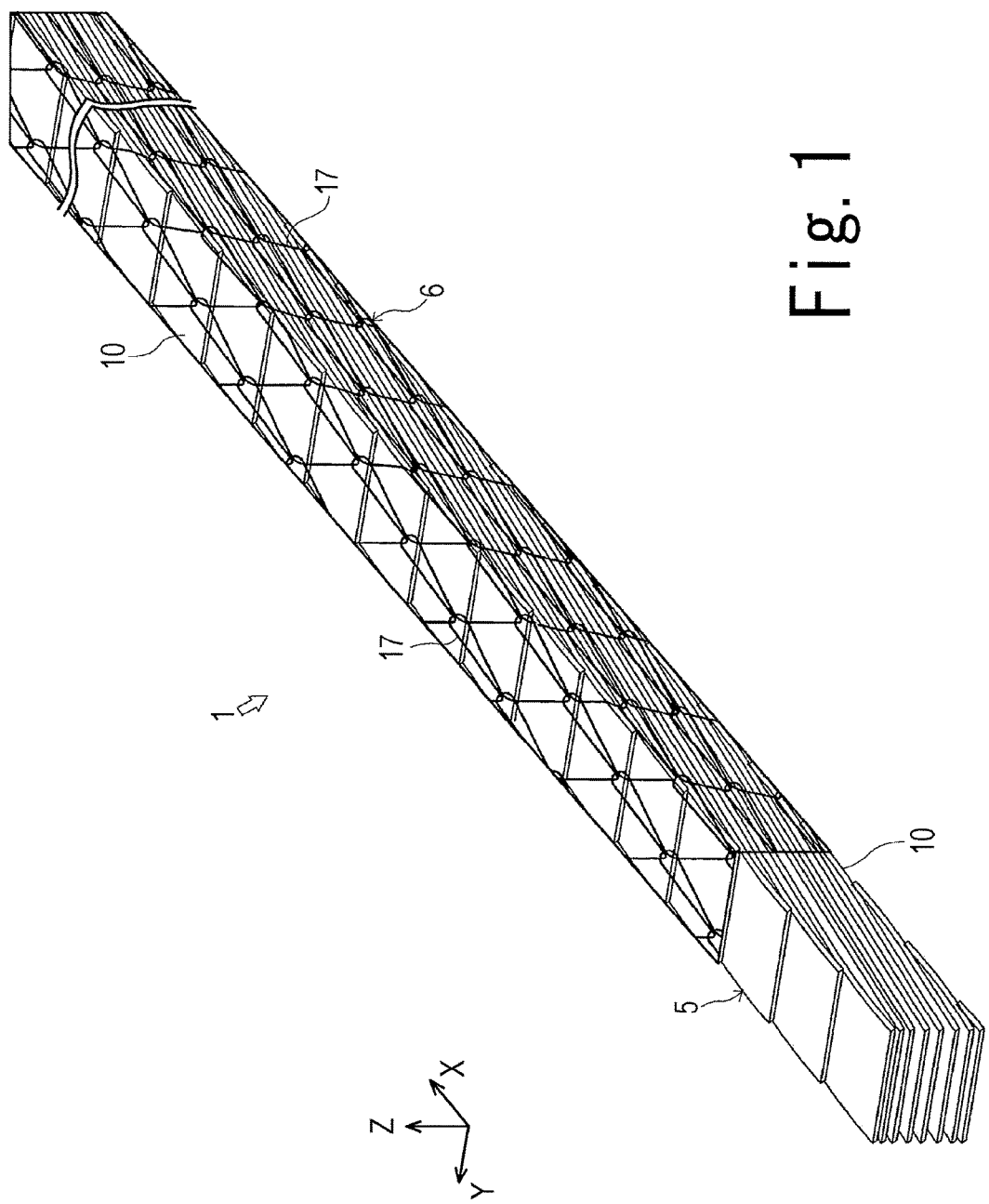
FIG. 1 is a perspective view of a sealing material composition of an embodiment of the invention.
Figure 2:
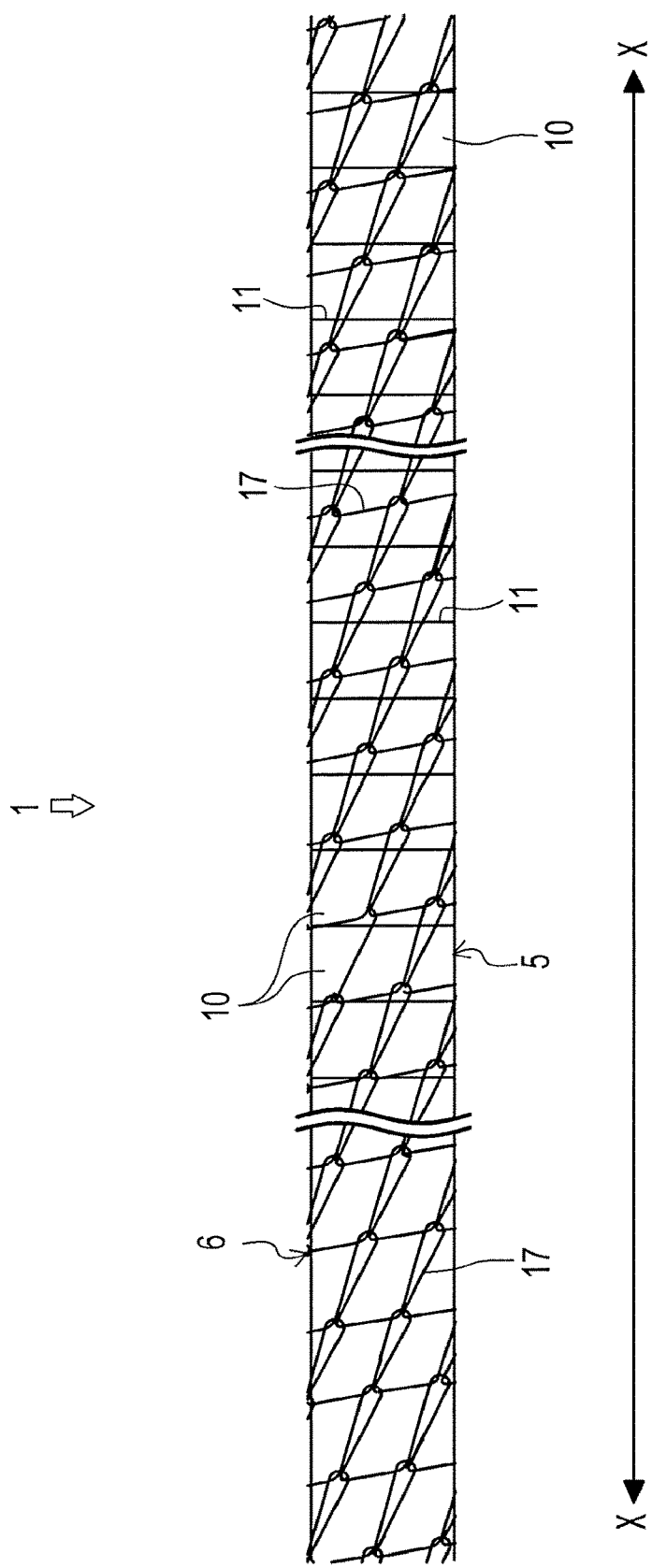
FIG. 2 is a schematic plan view of the sealing material composition of FIG. 1.
Figure 3:
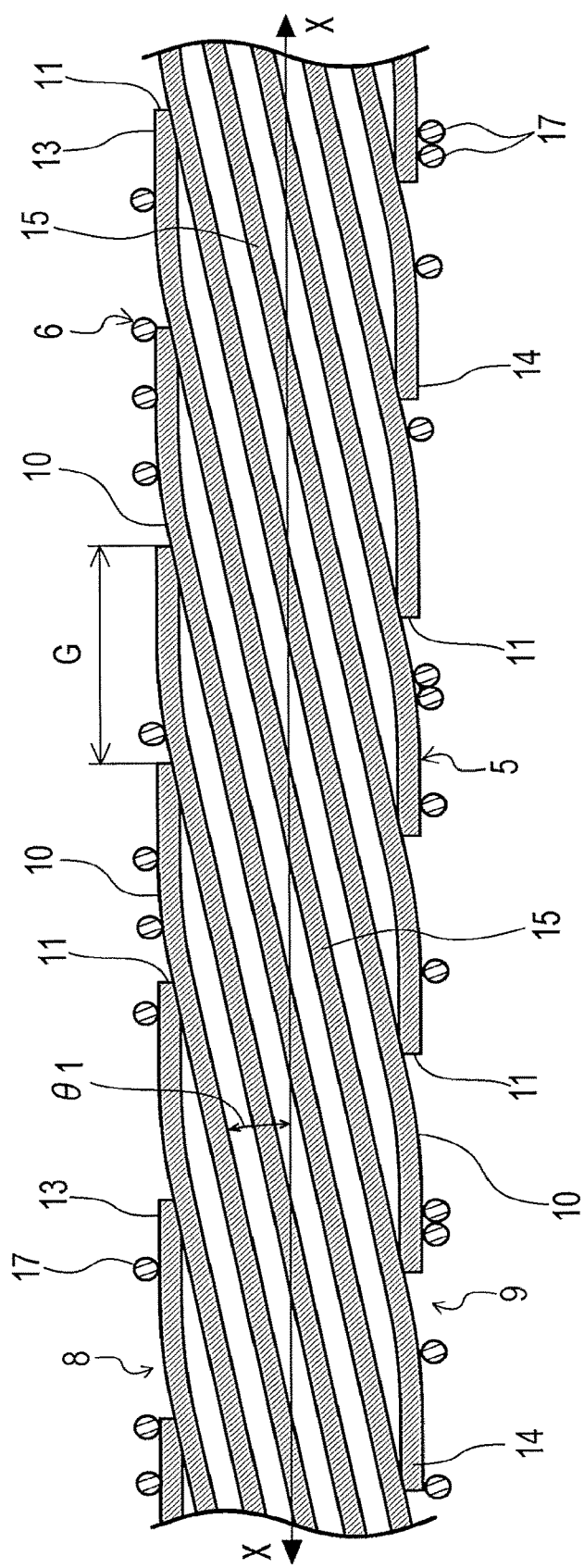
FIG. 3 is a schematic partial sectional view of the sealing material composition of FIG. 1.

FIG. 1 is a perspective view of a sealing material composition 1 of an embodiment of the sealing material of the invention, FIG. 2 is a schematic plan view of the sealing material composition 1, and FIG. 3 is a schematic partial sectional view of the sealing material composition 1.

In the sealing material composition 1 (a stacked body (sheet-like members 10) and surrounding body 6 which will be described later), it is assumed that the direction of the arrow X in FIG. 1 is the longitudinal direction, that of the arrow Y is the short direction, and that of the arrow Z is the thickness direction (vertical direction). In the drawings, the dimension ratios are adequately exaggerated for the sake of convenience in description, and may be sometimes different from the actual ratios.

The sealing material composition 1 contains expanded graphite as a material, is a member for forming a sealing material, and used for producing a sealing material such as a gland packing or a gasket. A part or whole of the sealing material composition 1 can be used for forming a part (for example, an inner core member) of the sealing material or the whole (for example, a molded packing) of the sealing material.

As shown in FIGS. 1 to 3, the sealing material composition 1 comprises the stacked body 5 and the surrounding body 6. The surrounding body 6 is formed into a long body, and disposed so as to surround the stacked body 5. In the embodiment, the sealing material composition 1 is a string-like (long) member exhibiting a rectangular parallelepiped shape, and has a longitudinal length which enables at least one sealing material such as a gland packing or a gasket to be produced.

The stacked body 5 has a plurality of sheet-like members 10. Each of the sheet-like members 10 is formed into a tape-like (belt-like) shape by, for example, expanded graphite. The sheet-like members 10 are stacked in a direction which intersects with the longitudinal direction of the surrounding body 6, and placed at predetermined intervals in the longitudinal direction. In the plurality of sheet-like members 10, sheet-like members 10 which are adjacent to each other in the stacking direction are disposed to be displaced from each other in the longitudinal direction of the surrounding body 6, in a relatively movable manner.

In the embodiment, each of the sheet-like members 10 is an expanded graphite-made tape-like member in which expanded graphite is the main component. The sheet-like member 10 is a belt-like member which has a rectangular parallelepiped shape that is substantially flat, and has an approximately constant thickness and a longitudinal length which is shorter than that of the surrounding body 6. The sheet-like members 10 may not be strictly identical in shape with one another, and may have a production error. The sheet-like members may have any shape, as far as the shape allows the stacked body 5 to be molded.

The plurality of sheet-like members 10 are placed so as to be elongated in a substantially same direction. The plurality of sheet-like members 10 are stacked so that the stacked body 5 has a rectangular parallelepiped shape except the both longitudinal end portions in a state where one of adjacent sheet-like members 10 is displaced by a predetermined distance from the other of the adjacent sheet-like members 10 in the longitudinal of the surrounding body 6.

Here, the above-described direction which intersects with the longitudinal direction of the surrounding body 6, i.e., the stacking direction of the plurality of sheet-like members 10 is a direction which is inclined with respect to the thickness direction that is perpendicular to the longitudinal and short directions of the surrounding body 6.

In adjacent sheet-like members 10, specifically, one sheet-like member 10 and another sheet-like member 10 are stacked so that they are relatively slidable in a direction (the longitudinal direction of the surrounding body 6) which is substantially perpendicular to the stacking direction. Irrespective of their slidings, the stacked state of the one and other sheet-like members 10 is maintained by the surrounding body 6.

As shown particularly in FIG. 3, in all places where a positional displacement occurs in the stacked body 5, the displacement distances G of adjacent sheet-like members 10 (namely, the displacement distances of the one sheet-like member 10 and the other sheet-like member 10) are set so as to be substantially same as one another along the longitudinal direction of the surrounding body 6 in the initial state shown in FIG. 3 so as to avoid a state wherein external force is applied to the sealing material composition 1, and the sealing material composition is flexed.

Between each pair of sheet-like members 10 which are adjacent to each other in the stacked state, a step portion 11 is formed in accordance with the thickness of the sheet-like member 10 of one side (or the sheet-like member 10 of the other side). The step portions 11 are formed in both upper and lower surface portions 8, 9 of the stacked body 5, respectively, and arranged along the longitudinal direction of the surrounding body 6 at substantially regular intervals.

The displacement distance G of adjacent sheet-like members 10 in the initial state is not particularly limited, and may be set so that the stacked state is maintained even when the displacement distance is increased from the displacement distance G in the initial state by a relative movement (relative sliding) of the adjacent sheet-like members 10. For example, the displacement distances G may be different from one another.

In the embodiment, each of the sheet-like members 10 has: one longitudinal end portion 13 which is exposed in the upper surface portion 8; another longitudinal end portion 14 which is exposed in the lower surface portion 9; and a longitudinal middle portion 15 through which the one longitudinal end portion 13 and the other longitudinal end portion 14 are connected to each other. The one and other longitudinal end portions 13, 14 of the sheet-like member 10 are elongated in a direction which is inclined with respect to the longitudinal direction of the surrounding body 6 so that the one longitudinal end portion 13 is contacted with one side of the surrounding body 6, and the other longitudinal end portion 14 is contacted with another side of the surrounding body 6. The one side (the side of the upper surface portion 8 of the stacked body 5) and the other side (the side of the lower surface portion 9) are opposite to each other across the longitudinal middle portion 15.

As shown in FIG. 3, in the upper and lower surface portions 8, 9 of the stacked body 5, specifically, the step portions 11 are formed by the one and other longitudinal end portions 13, 14 of the sheet-like members 10. The longitudinal middle portion 15 constituting the major part of each of the sheet-like members 10 has a predetermined inclination angle θ1 with respect to the longitudinal direction of the surrounding body 6.

Each of the sheet-like members 10 configures one layer of the stacked body 5. In the embodiment, the stacked body 5 has a structure in which seven sheet-like members 10 are stacked. The number of stacked sheet-like members 10 is not particularly limited, and may be adequately set in accordance with the thickness of each sheet-like member 10 or the like. It is requested to stack at least two sheet-like members 10.

In FIGS. 1 and 3, the gaps are exaggeratingly illustrated between adjacent sheet-like members 10. Actually, the plurality of sheet-like members 10 are stacked so as to form substantially no gaps (see FIG. 4), and therefore the stacked body 5 is more flattened as compared with the stacked body shown FIGS. 1 and 3.

In the embodiment, at least one of the one and other longitudinal end portions 13, 14 of each of the sheet-like members 10 is disposed so as to be elongated along the longitudinal direction of the surrounding body 6. Specifically, both the one and other longitudinal end portions 13, 14 are bent with respect to the longitudinal middle portion 15 so as to be elongated in substantially parallel to the longitudinal direction of the surrounding body 6.

For example, each of the sheet-like members 10 has a length in the longitudinal direction of about 100 mm or more and 300 mm or less (preferably, 150 mm or more and 250 mm or less), a length in the short direction (the direction which is perpendicular to both the longitudinal direction and the thickness direction Z) of about 1 mm or more and 30 mm or less (preferably, 3 mm or more and 15 mm or less), and a thickness of about 0.01 mm or more and 3.0 mm or less (preferably, 0.1 mm or more and 1.0 mm or less).

The longitudinal, short, and thickness directions of the sheet-like members 10 are identical with those of the sealing material composition 1, respectively.

As shown in the figures, the surrounding body 6 is configured so as to allow adjacent sheet-like members 10 (the stacked body 5) to be relatively moved in the longitudinal direction of the surrounding body 6, while maintaining the stacked state of the sheet-like members. In the embodiment, the surrounding body 6 has a tubular shape in which the stacked body 5 can be inserted in the longitudinal direction of the surrounding body. The both longitudinal end portions of the surrounding body 6 are configured so as to be able to have a released state where those of the stacked body 5 are exposed.

The surrounding body 6 is a net-like member having a mesh structure, and elongated in the longitudinal direction in a state where the surrounding body 6 is substantially in contact with the surface layers of the stacked body 5 which is surrounded by the surrounding body 6. The surrounding body 6 is formed so that its external shape in a state where the surrounding body 6 surrounds the stacked body 5 substantially forms the external shape of the sealing material composition 1. The surrounding body 6 is configured by using wire members 17 which are knitted by an adequate knitting method (for example, the loop-forming knitting method), or which are braided by an appropriate braiding method.

Although, in the embodiment, the surrounding body 6 comprises the wire members 17 which are twisted at predetermined angle with respect to the longitudinal direction, the surrounding body is not limited to this, and may comprise wire members which are elongated in a direction that is approximately identical with the longitudinal direction. The intervals of the wire members 17 may be uneven as shown in the figures, or approximately even.

As the wire members 17, for example, useful are: metal wires configured by a nickel alloy, or an alloy or the like in which iron is the main component, such as stainless steel; a natural resin such as natural rubber; a synthetic resin; a fluorine resin such as polytetrafluoroethylene; natural or synthetic resin fibers; and the like. In the embodiment, metal wires are used as the wire members 17. The wire members 17 are round wires having a diameter of, for example, about 0.01 mm or more and 1 mm or less. Actually, the surrounding body 6 surrounds the stacked body 5 which is more flattened as compared with the stacked body shown in FIGS. 1 and 3 so that gaps are not substantially formed between adjacent sheet-like members 10 as described above.

In this configuration, when the sealing material composition 1 is flexed and curved in order to, for example, produce a sealing material by using the sealing material composition 1, or convey the sealing material composition 1 while winding the composition around a round rod member, each of adjacent sheet-like members 10 can be slid in the longitudinal direction of the surrounding body 6 so that the sheet-like members are positionally displaced from each other.

In the sealing material composition 1, namely, adjacent sheet-like members 10, i.e., one sheet-like member 10 and the other sheet-like member 10 can be relatively moved along the longitudinal direction of the surrounding body 6 while the adjacent sheet-like members 10 are flexed. In this case, moreover, the stacked state of the adjacent sheet-like members 10 can be maintained.

Figure 4:
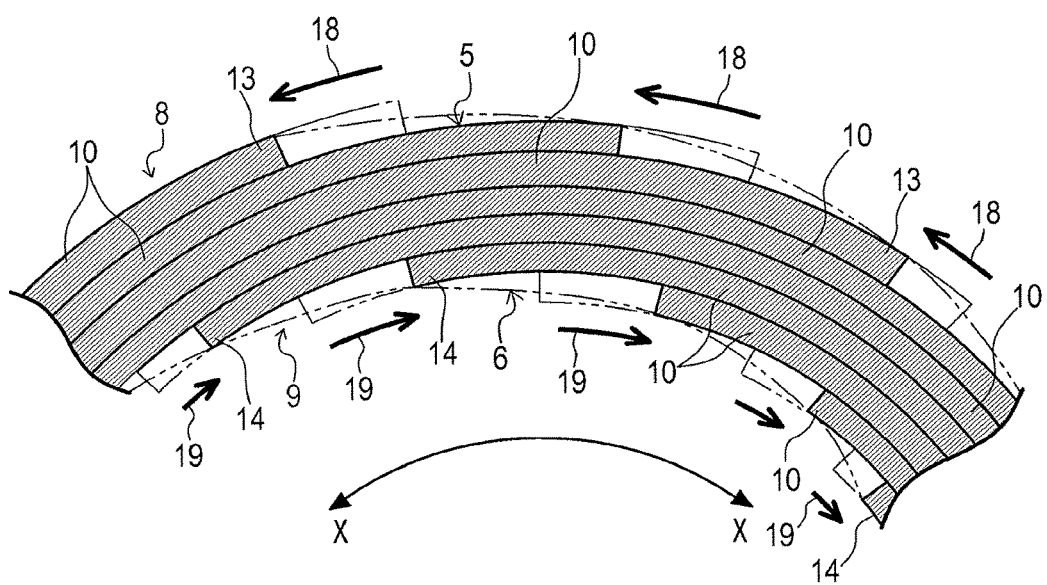
FIG. 4 is a schematic partial sectional view of the sealing material composition of FIG. 1 in the case where the composition is flexed.

As shown in FIG. 4, while maintaining the stacked state of the plurality of sheet-like members 10, specifically, the one longitudinal end portions 13 can be slid as indicated by the arrows 18 in the upper (on the side of the outer circumferential surface) surface portion 8 of the stacked body 5, and the other longitudinal end portions 14 can be slid as indicated by the arrows 19 in the lower (on the side of the inner circumferential surface) surface portion 9 of the stacked body 5.

Therefore, it is possible to, when an external force is applied to the sealing material composition 1 in order to curve it, block a portion which is sharply bent, from being formed in the sealing material composition 1, and hence it is further possible to prevent one of the sheet-like members 10 from being broken because of such a bent portion. Consequently, a defect which may cause the performance to be lowered can be prevented from occurring in the sealing material composition 1.

Figure 5:
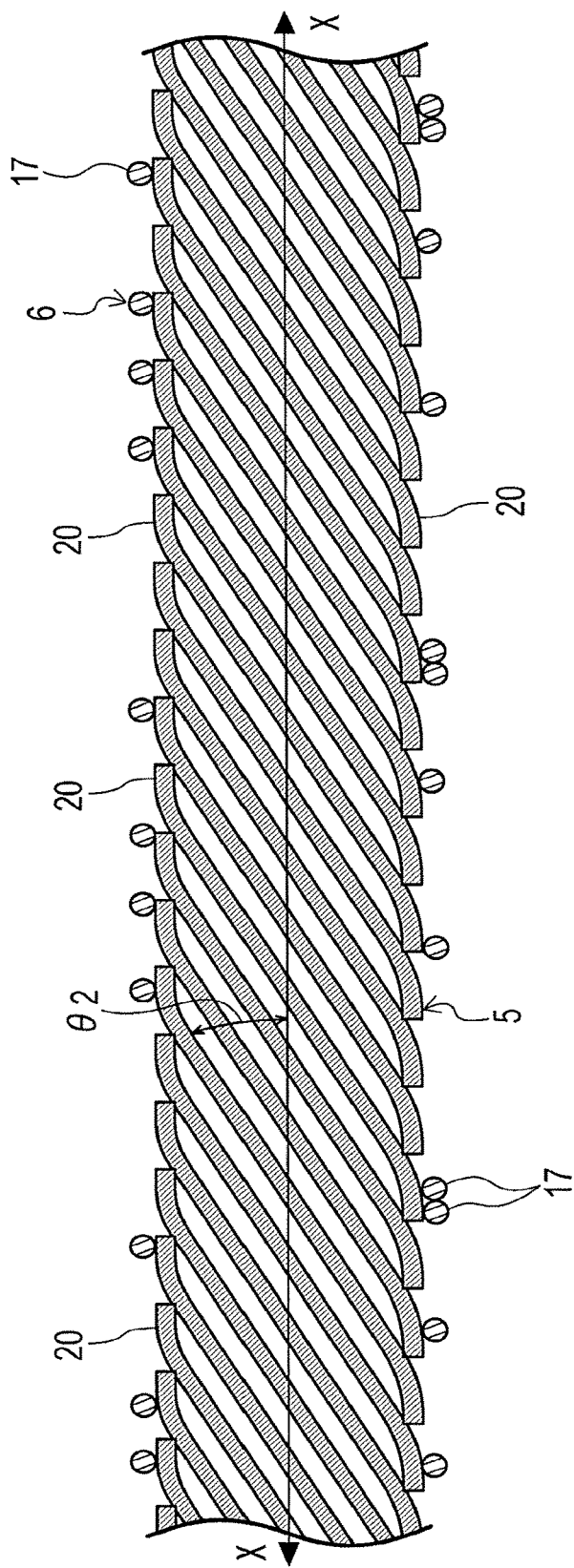
FIG. 5 is a schematic partial sectional view of a sealing material composition of another embodiment of the invention.

The sealing material composition 1 of the invention is not limited to the above-described embodiment. As shown in FIG. 5, for example, sheet-like members 20 may have a longitudinal length which is shorter than that of the sheet-like members 10, and an inclination angle 92 which is larger than the inclination angle θ1 in the embodiment. Although not illustrated, the sheet-like members 20 may have a longitudinal length which is longer than that of the sheet-like members 10, and an inclination angle which is smaller than the inclination angle θ1, with respect to the longitudinal direction of the surrounding body 6.

An experiment on the flexibility of the the sealing material composition confirmed that the above-described effects are attained. The experiment was performed by the following method. In the experiment, as sheet-like members, Example 1 of the invention, Example 2 of the invention, and Comparative Example 1 having a structure which is similar to that of a conventional sheet-like member were prepared. Moreover, first and second round rod members were prepared.

Example 1 has a structure similar to that of the sealing material composition 1. The plurality of sheet-like members 10 in the stacked body 5 have a longitudinal length of about 200 mm, and constitute a structure in which seven layers of sheet-like members are stacked. The plurality of sheet-like members 10 are placed with the displacement distances G which enable the sheet-like members to form five step portions 11 at intervals of 10 cm in the longitudinal direction of the surrounding body 6.

Example 2 has a structure similar to that of the sealing material composition shown in FIG. 5. The plurality of sheet-like members 20 in the stacked body 5 have a longitudinal length of about 100 mm, and constitute a structure in which seven layers of sheet-like members are stacked. The plurality of sheet-like members 20 are placed with the displacement distances G which enable the sheet-like members to form seven step portions 11 at intervals of 10 cm in the longitudinal direction of the surrounding body 6.

Figure 6:
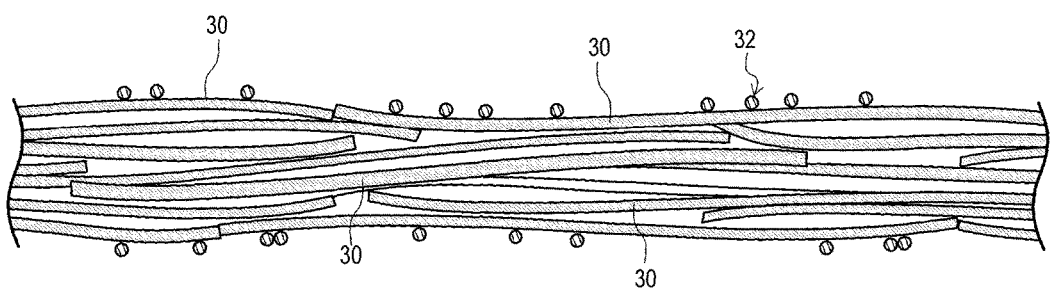
FIG. 6 is a schematic partial sectional view of a conventional sealing material composition which is a comparative example.

Comparative Example 1 has a structure similar to that of the conventional sealing material composition shown in FIG. 6. A plurality of fibrous members 30 are filled into a surrounding body 32 so as to be randomly arranged. The fibrous members 30 are placed so that a step portion is not formed in the vicinity of the surrounding body 32, and many (a large area) gaps are produced in the surrounding body 32.

The first round rod member is configured so that Example 1, Example 2, and Comparative Example 1 can be wound around the member over the whole circumference, and has a diameter of 10 mm. The second round rod member is configured so that Example 1, Example 2, and Comparative Example 1 can be wound around the member over the whole circumference, and has a diameter of 30 mm.

Each of Example 1, Example 2, and Comparative Example 1 was wound around each of the first and second round rod members over a substantially whole circumference while being flexed and curved. Thereafter, each of Example 1, Example 2, and Comparative Example 1 was detached from the first and second round rod members, and the states of the sheet-like members 10, 20 and the fibrous members 30 were checked.

FIG. 7 shows the results of the experiment. In Example 1 and Example 2, no breakage was observed (in the figure, this is indicated by the symbol "○") in all of the sheet-like members 10, 20. In Comparative Example 1, by contrast, breakage extending over the all layers was observed (in the figure, this is indicated by the symbol "×") in two places in the longitudinal direction of the surrounding body 32.

In the embodiment, as described above, the sheet-like members 10 are elongated in the direction inclined with respect to the longitudinal direction of the surrounding body 6. When a bending action is applied to the sealing material composition 1, therefore, adjacent sheet-like members 10 can be smoothly slid. Consequently, it is possible to cause breakage to more hardly occur in the plurality of sheet-like members 10.

In the embodiment, the one and other longitudinal end portions 13, 14 of the sheet-like members 10 are disposed so as to be elongated along the longitudinal direction of the surrounding body 6. Therefore, the end portions 13, are not projected from the mesh portion of the surrounding body 6 toward the outside. Consequently, the one and other longitudinal end portions 13, 14 can be prevented from being broken by collision with an installation article or the like which is disposed in the outside.

Next, an embodiment of the gland packing of the invention containing the above-described sealing material composition 1 will be described with reference to the drawings.

Figure 8:
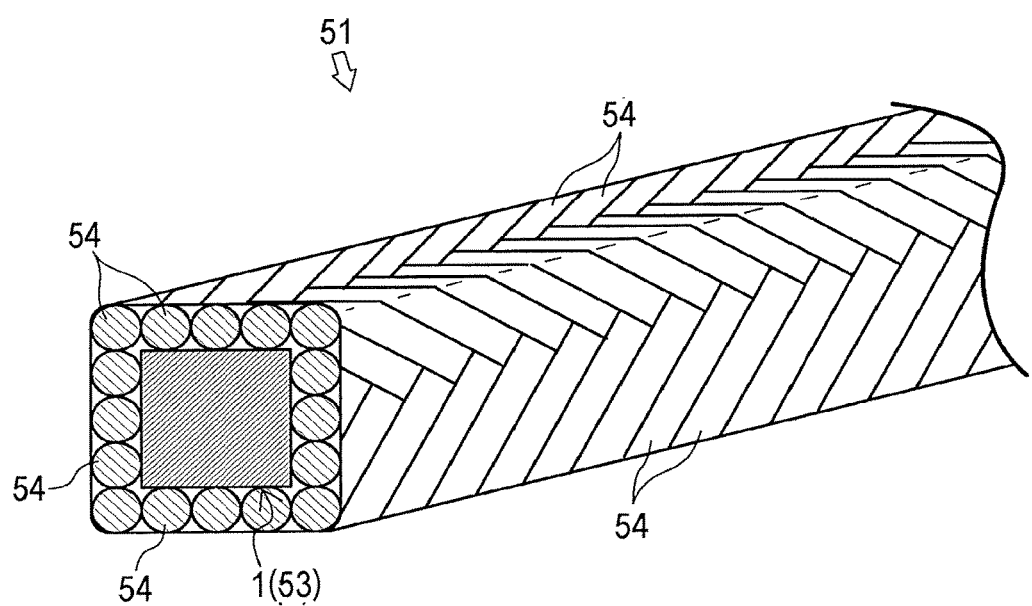
FIG. 8 is a partial sectional perspective view of a gland packing of a further embodiment of the invention.
Figure 9A:
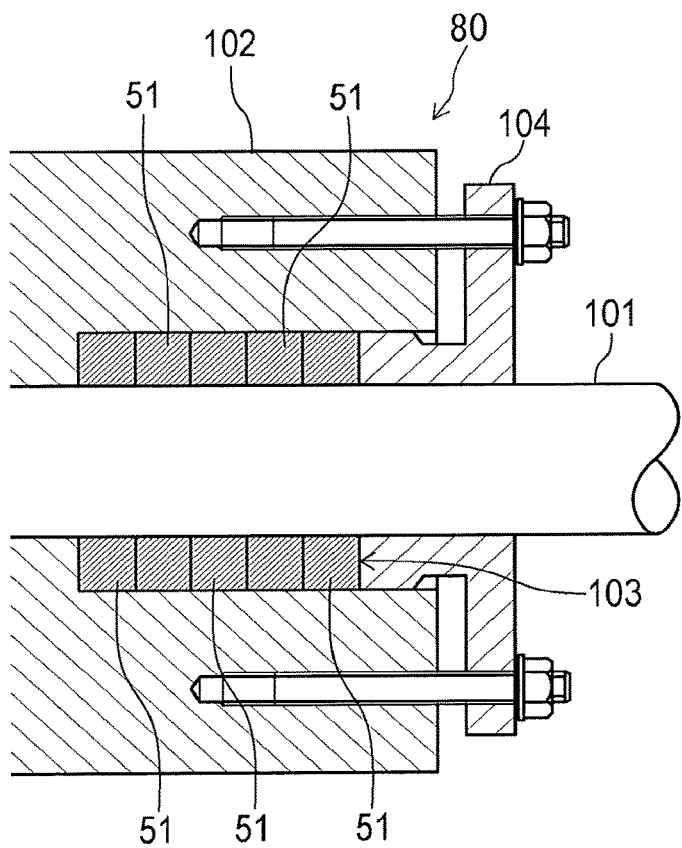
FIG. 9A is a sectional view showing an example of a use state of the gland packing of FIG. 8.
Figure 9B:
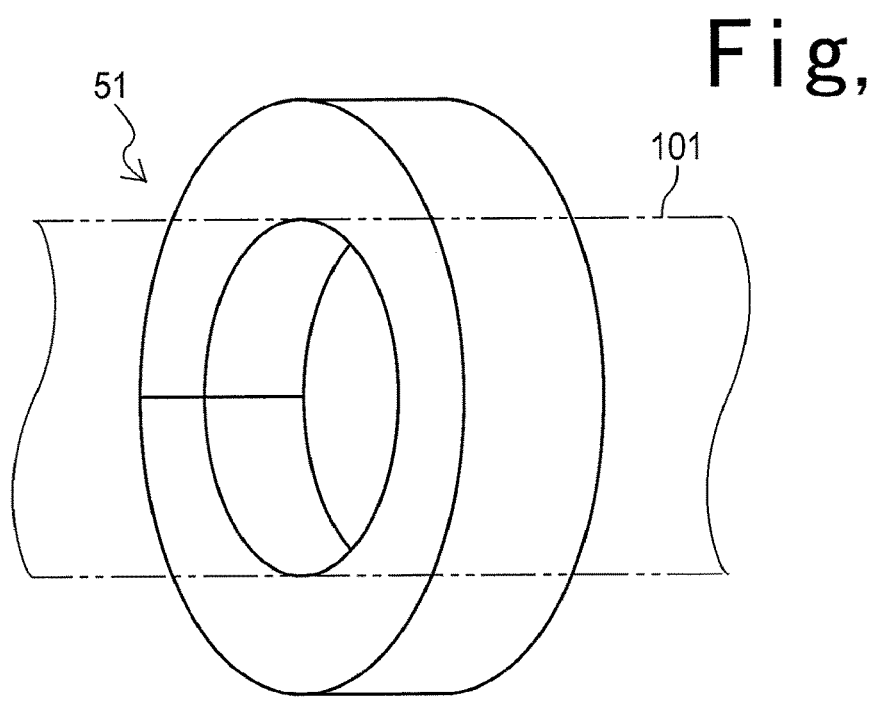
FIG. 9B is a schematic perspective view of the gland packing of FIG. 9A.
Figure 10:
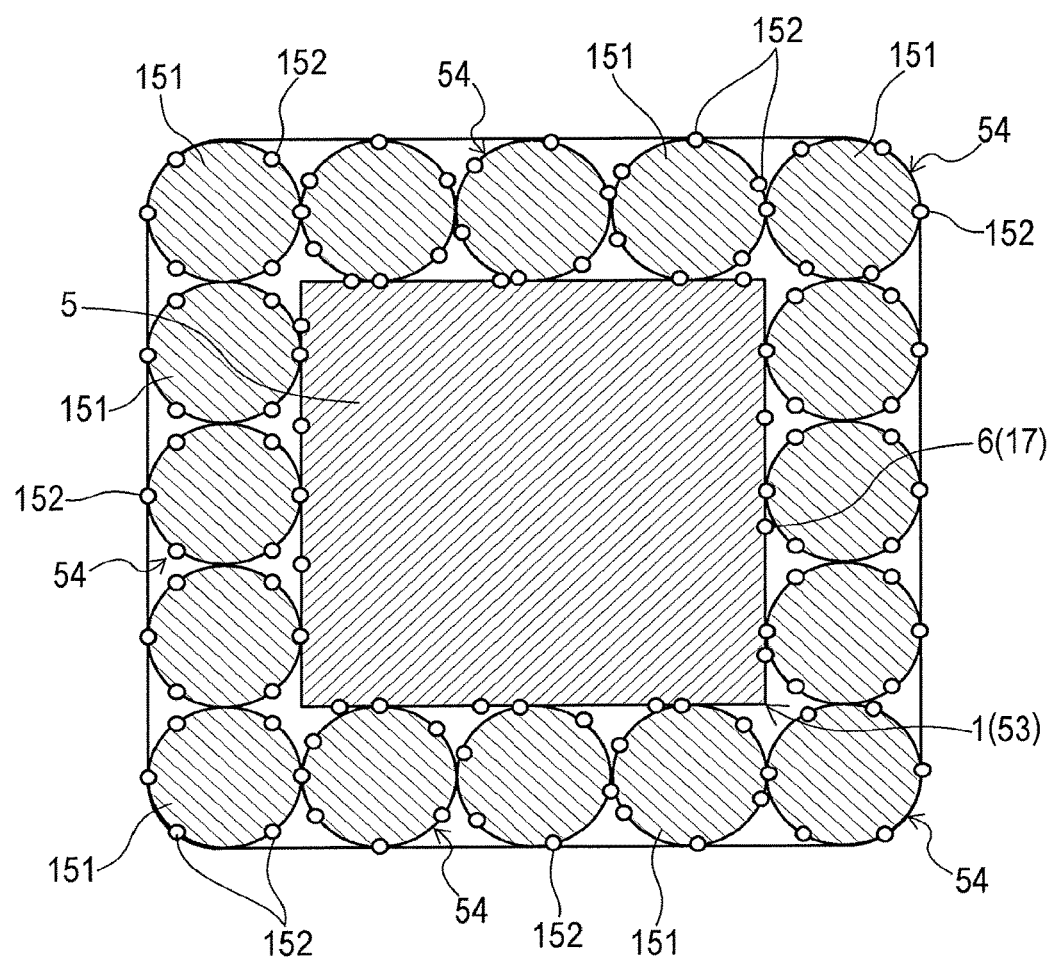
FIG. 10 is a sectional view of the gland packing of FIG. 8.

FIG. 8 is a partial sectional perspective view of a gland packing 51 which is an embodiment of the gland packing of the invention, FIG. 9A is a sectional view showing an example of a use state of the gland packing 51, FIG. 9B is a schematic perspective view of the gland packing 51 of FIG. 9A, and FIG. 10 is a sectional view of the gland packing 51. In these figures, for the sake of convenience of description, the gland packing 51 is diagrammatically illustrated.

As shown in FIG. 8, the gland packing 51 is a string-like sealing material configured by using the sealing material composition 1. As shown in FIG. 9A, the gland packing 51 is configured so as to be able to seal a gap between an inner sealed portion (a shaft member of a predetermined apparatus) 101 and outer sealed portion (a stationary portion of the predetermined apparatus) 102 which are opposed to each other during use, in a state where the gland packing 51 is compressed in a direction (the axial direction of the shaft member) that is substantially perpendicular to the opposing direction of the portions.

In the embodiment, as shown in FIGS. 8 and 10, the gland packing 51 comprises an inner core member 53 configured by the sealing material composition 1. The gland packing 51 further comprises a plurality of yarns 54 which are disposed in the periphery of the inner core member 53 as other sealing material compositions in a state where the yarns are twisted or braided together. The gland packing 51 is formed into a string-like shape having a predetermined longitudinal length.

When the gland packing 51 is to be used, as shown in FIG. 9B, for example, the packing is firstly formed or compression molded into a ring-like shape which corresponds to the inner sealed portion 101. As shown in FIG. 9A, then, the gland packing 51 is stuffed into a stuffing box 103 of the outer sealed portion 102. The stuffing box 103 is located in the periphery of the inner sealed portion 101. Thereafter, the gland packing 51 is held in a state where the packing is tightened by a gland (packing gland) 104.

In the case where, as shown in FIG. 9B, the gland packing 51 is formed into a ring-like shape which corresponds to the inner sealed portion 101, a direction intersecting with the longitudinal direction of the surrounding body 6 of the sealing material composition 1 constituting the inner core member 53, i.e., the stacking direction of the plurality of sheet-like members 10 (the stacked body 5) may be set as the vertical direction (substantially coincident with a radial direction of the inner sealed portion 101) in FIG. 10, the lateral direction (substantially coincident with the axial direction of the inner sealed portion 101) in FIG. 10, or a diagonal direction in FIG. 10. Preferably, the stacking direction is set as the lateral direction in FIG. 10 (in other words, the sheet-like members 10 are arranged in a vertical direction (a direction which is substantially perpendicular) with respect to the axial direction of the inner sealed portion 101).

In the embodiment, as shown in FIGS. 8 and 10, the yarns 54 are disposed in a plural number, i.e., 16 yarns. The yarns 54 are elongated along the inner core member 53 in the longitudinal direction of the member, and twisted or braided together so as to be bundled (disposed) around the inner core member 53, thereby forming the string-like gland packing 51 having an elongated shape.

The yarns 54 are 16-strand hollow braided so as to cover the inner core member 53. Although, in the embodiment, the yarns 54 which constitute the gland packing 51 together with the inner core member 53 have the configuration in which the 16-strand hollow braiding using 16 yarns is employed, the configuration of the yarns is not limited to this. For example, the yarns may have a configuration in which the 4-strand square braiding using four yarns or the 8-strand square braiding using eight yarns is employed.

The yarns 54 are formed to be thinner than the string-like inner core member 53. In the embodiment, (the content rate of) the inner core member 53 in the gland packing 51 is set so as to be 5 mass % or more and 70 mass % or less based on the total mass of the gland packing 51, and therefore the yarns 54 have a content rate (mass ratio) corresponding to the content rate of the inner core member.

Although the detail will be described later with reference to FIG. 12, when the content rate of the inner core member 53 in the gland packing 51 is less than 5 mass %, the rate (the remaining percentage of the tightening force) at which the initial tightening force remains after completion of tightening is lowered (in the specification, this phenomenon is also referred to as "stress relaxation"). The sealing property is lowered with occurrence of the stress relaxation, and therefore it is necessary that the content rate of the inner core member 53 in the gland packing 51 is 5 mass % or more. One of causes of the phenomenon that the initial tightening force is not maintained and the stress relaxation occurs is that the gland packing 51 itself protrudes through a gap of the apparatus, and the volume of the gland packing 51 is reduced. When the content rate of the inner core member 53 in the gland packing 51 exceeds 70 mass %, by contrast, the rate of the yarns 54 with respect to the gland packing 51 is increased, and the amount of a lubricant becomes inadequate, whereby the sealing property is lowered. In order to prevent this from occurring, it is necessary to set the content rate of the inner core member 53 in the gland packing 51 to 70 mass % or less.

More preferably, the content rate of the inner core member 53 in the gland packing 51 is set to 5 mass % or more and 50 mass % or less based on the total mass of the gland packing 51, and, further preferably, is set to 20 mass % or more and 50 mass % or less. When the content rate of the inner core member 53 in the gland packing 51 is set to 20 mass % or more and 50 mass % or less, the leakage amount can be further reduced, and a remaining percentage of the tightening force which is higher than a predetermined value can be easily ensured.

In the above, it is assumed that all of the yarns 54 have a substantially same structure. Alternatively, for example, a part of the yarns 54 may have a structure which is different from that of the other yarns 54.

In the embodiment, as shown in FIG. 10, each of yarns 54 is configured by an expanded graphite material 151, a lubricant, and a reinforcing material 152 for reinforcing the expanded graphite material 151. The expanded graphite material 151 is formed in an elongated shape. The lubricant is disposed so as to be generally interposed between adjacent ones of the yarns 54. An example of the lubricant is fluorine resin powder (PTFE dispersion or the like).

The reinforcing material 152 is configured by using at least one wire member for reinforcing outwardly or inwardly the expanded graphite material 151. In the embodiment, the reinforcing material 152 reinforces outwardly the expanded graphite material 151, and is formed to be thinner than the expanded graphite material 151. Examples of the at least one wire member constituting the reinforcing material 152 are a metal wire of a nickel alloy, stainless steel, or the like, and a non-metal wire configured by organic fibers (cotton or the like) or inorganic fibers (carbon fibers or the like).

In the case where an outward reinforcement structure in which the reinforcing material 152 reinforces outwardly the expanded graphite material 151 is employed as in the embodiment, the expanded graphite material 151 is configured by a plurality of fibrous expanded graphites, and the reinforcing material 152 is a tubular member which is formed by the loop-forming knitting method using at least one wire member, and into which the expanded graphite material 151 is filled. The outward reinforcement structure is not limited to this. For example, the outward reinforcement structure may be formed so that the expanded graphite material 151 is folded in mountain folds and valley folds, or mountain folds, or valley folds, and the reinforcing material 152 is a braided body which is configured by the above-described at least one wire member, and which covers the expanded graphite material 151 in the folded state.

In place of the outward reinforcement structure, an inward reinforcement structure in which the reinforcing material 152 reinforces inwardly the expanded graphite material 151 may be employed. In this case, for example, an inward reinforcement structure may be employed in which the reinforcing material 152 is disposed so to be elongated along the expanded graphite material 151, and the expanded graphite material 151 in this state is formed into a string-like body in which the expanded graphite is folded in mountain folds and valley folds, or mountain folds, or valley folds so as to envelop the reinforcing material 152. Alternatively, an inward reinforcement structure may be employed in which the reinforcing material 152 is disposed so to be elongated along the expanded graphite material 151, and the expanded graphite material 151 in this state is formed into a string-like body in which the expanded graphite material is twisted.

According to the configuration, in the case where, when the gland packing 51 is to be used, the gland packing is curved into a ring-like shape in order that the packing is placed between the inner sealed portion and the outer sealed portion, i.e., in order that the packing is stuffed into a stuffing box of a predetermined apparatus, the inner core member 53 (the sealing material composition 1) of the gland packing 51 enables adjacent sheet-like members 10 to be slid in the longitudinal direction of the surrounding body 6 so that the sheet-like members are positionally displaced from each other, as described above.

While preventing the expanded graphite of the sheet-like members 10 from being partly broken, therefore, it is possible to improve the flexibility of the inner core member 53, i.e., that of the gland packing 51 using the inner core member. When the gland packing 51 is curved, consequently, the lowering of the sealing property of the inner core member 53 which is due to partial breakage of the expanded graphite of the sheet-like members 10 can be suppressed from occurring. Therefore, the sealing property of the gland packing 51 can be improved.

In the case where, when the gland packing 51 is to be used as shown in, for example, FIG. 10, the gland packing 51 is formed into a ring-like shape so that the stacking direction of the sheet-like members 10 in the inner core member 53 coincides with the axial direction of the inner sealed portion, the stacked sheet-like members 10 can be held in a state where the sheet-like members are folded in a complex manner, and the sealing property of the inner core member 53 can be improved. Therefore, the sealing property of the gland packing 51 can be further improved.

In the embodiment, the inner core member 53 in which a lubricant is not used is employed, and hence the used amount of a lubricant which is a cause of the stress relaxation can be reduced in the gland packing 51. Therefore, the stress relaxation can be suppressed, and hence the lowering of the tightening force due to the gland can be suppressed. As a result, a gap is hardly formed between the gland packing 51 and the inner surface of the stuffing box, and an excellent sealing property can be ensured for a long period of time.

When the following experiment was performed, it was confirmed that the use of the gland packing of the invention can suppress reduction of the leakage amount of the fluid per unit time (the sealing property), and the lowering of the remaining percentage of the tightening force (the stress relaxation). In the experiment, Examples 3 to 7 of the invention were prepared, and Comparative Examples 2 and 3 were prepared. Moreover, an experimental apparatus 70 corresponding to the examples and the comparative examples was prepared.

Example 3 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=5:95.

Example 4 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=20:80.

Example 5 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=30:70.

Example 6 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=50:50.

Example 7 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=70:30.

Comparative Example 2 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=4:96.

Comparative Example 3 is a gland packing which comprises: an inner core member having a mass ratio of the stacked body (expanded graphite):the surrounding body (metal wires)=85:15; and a plurality of yarns having a mass ratio of the expanded graphite material:the reinforcing material (metal wire):the lubricant=80:10:10, and which has a mass ratio of the inner core member:the plurality of yarns=71:29.

Figure 11:
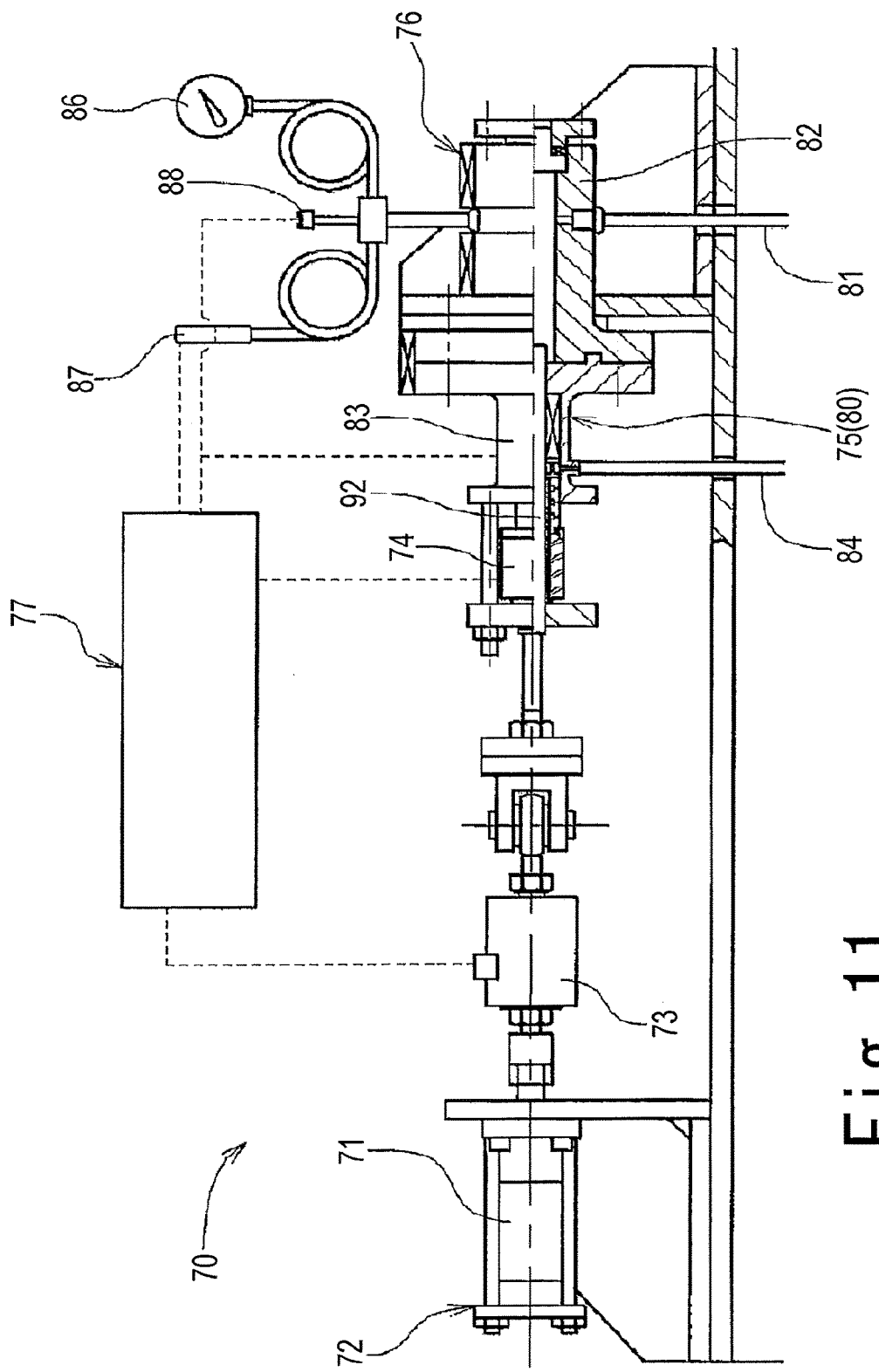
FIG. 11 is a diagram schematically showing an experimental apparatus.

As shown in FIG. 11, the experimental apparatus 70 comprises a hydraulic unit 72 including a hydraulic cylinder 71, a first load transducer 73 for measuring the axial load, a second load transducer 74 for measuring the tightening force, a packing box 75, a heater 76, and a controller 77. A sealing device 80 such as shown in FIG. 9A can be incorporated in the packing box 75.

The experimental apparatus 70 is configured so that a fluid to be sealed is introduced into a box basal portion 82 through an inlet path 81, the temperature of the introduced fluid to be sealed is raised by the heater 76, the fluid to be sealed is then supplied to the sealing device which is incorporated in the packing box 75, and the fluid that leaks from the sealing device to which the fluid to be sealed is supplied is discharged from a box main portion 83 through a discharge path 84.

The experimental apparatus 70 further comprises: a pressure gauge 86 for detecting the pressure of the fluid to be sealed which is supplied to the sealing device; a pressure transducer 87 for transducing the detected pressure to a control signal; and a temperature sensor 88 for detecting the temperature of the fluid to be sealed. The experimental apparatus 70 further comprises a load cell (not shown) for measuring the remaining percentage of the tightening force, in the sealing device.

Referring to FIG. 9A, the sealing device comprises: the stuffing box 103 of the outer sealed portion 102 (the packing box 75); gland packings (members which are placed like the gland packing 51) which are stuffed into the stuffing box 103 in a state where the packings surround the inner sealed portion (stem) 101; and the gland (packing gland) 104 for tightening the gland packings in the state where the gland packings are stuffed into the stuffing box 103.

The sealing device is configured so that, when bolts which are disposed on the side of the gland 104 are fastened, the plurality of gland packings (of one of Examples 3 to 7, and Comparative Examples 2 and 3) that are arranged in the axial direction of the stem 101 are pressed in the axial direction of the stem 101, and a sealing portion that seals the gap between the inner surface of the stuffing box 103 and the outer surface of the stem 101 is formed.

In the experiment, firstly, the gland packings of Examples 3 to 7 and Comparative Examples 2 and 3 are compress-molded into a ring-like shape corresponding to the stem 101. Then, the plurality of gland packings of one of Examples 3 to 7 and Comparative Examples 2 and 3 are disposed in the sealing device so as to surround the stem 101. Next, the sealing device comprising the gland packings is incorporated in the packing box 75.

Then, the temperature of the fluid to be sealed which has been introduced into the box basal portion 82 through the inlet path 81 is raised by the heater 76. Next, the fluid to be sealed in which the temperature has been raised is supplied from the box basal portion 82 to the sealing device that is incorporated in the packing box 75. When the supply of the fluid to be sealed is to be supplied, the hydraulic cylinder 71 of the hydraulic unit 72 is driven, thereby causing the stem 101 to be reciprocally slid.

In the experimental apparatus 70, during the above, the leakage amount (the leakage amount per unit time) of the fluid from the discharge path 84 is measured, the remaining percentage of the tightening force is measured by the load cell, and the measured values are stored in the controller 77. The pressure and temperature of the fluid, the tightening force applied to the sealing device (gland packings), and the axial load acting on the stem 101 are measured, and the measured values are collected in the controller 77 to be stored therein.

The conditions of the experiment using the experimental apparatus 70 are as follows. In Examples 3 to 7 and Comparative Examples 2 and 3, each of the gland packings which are compress-molded into a ring-like shape has dimensions of φ24 (inner diameter)×φ37 (outer diameter)×t6.4 (height), the liquid temperature is 400° C., and the liquid pressure is 15.5 MPa.

According to the experiment, the experimental results shown in FIG. 12 were obtained. From the experimental results shown in FIG. 12, it was revealed that, in each of Examples 3 to 7, the leakage amount (the leakage amount per unit time) from the discharge path 84, and the lowering of the remaining percentage of the tightening force (stress relaxation) can be suppressed, and are within predetermined reference values (in the figure, this is indicated by the symbol "○"). Namely, it became apparent that the examples have an effect that the leakage amount (sealing property) of the fluid per unit time, and the lowering of the remaining percentage of the tightening force can be suppressed, i.e., an effect that the sealing property can be improved.

From the experimental results shown in FIG. 12, it was revealed that, in Comparative Example 2, it is difficult to suppress the lowering of the remaining percentage of the tightening force, and the remaining percentage is deviated from the predetermined reference values (in the figure, this is indicated by the symbol "x"). Moreover, it was revealed that, in Comparative Example 3, it is difficult to suppress the leakage amount (the leakage amount per unit time) from the discharge path 84, and the leakage amount is largely deviated from the predetermined reference values (in the figure, this is indicated by the symbol "x"). Namely, it became apparent that, in a configuration such as that of Comparative Example 2 or 3, the improvement of the sealing property cannot be expected.

Although, in the embodiment, the gland packing of the invention is configured by the inner core member 53 (the sealing material composition 1) and the yarns 54, the configuration of the gland packing is not limited to this. The gland packing may be formed by only the sealing material composition 1 without using the yarns 54.

Obviously, numerous modifications and variations of the present invention are possible in light of the above teachings. It is therefore to be understood that within the scope of the appended claims, the invention may be practiced otherwise than as specifically described herein.

1 sealing material composition
5 stacked body
6 surrounding body
10 sheet-like member
13 one longitudinal end portion of sheet-like member
14 other longitudinal end portion of sheet-like member
15 longitudinal middle portion of sheet-like member
51 gland packing
53 inner core member 54 yarn
151 expanded graphite material
152 reinforcing material

The invention claimed is:

1. A sealing material composition, comprising:
sheet-like members that are each expanded graphite in a shape of an elongated plane; and
a surrounding body that has an elongated, tubular shape that surrounds the sheet-like members stacked on top of each other, the surrounding body allowing an adjacent two of the sheet-like members to move parallel to each other, while maintaining the sheet-like members inclined at substantially a same angle with respect to a longitudinal direction of the surrounding body and spanning an entire width and height of the surrounding body.

2. The sealing material composition according to claim 1, wherein the sheet-like members are placed at predetermined intervals along the longitudinal direction of the surrounding body.

3. The sealing material composition according to claim 1, wherein:
each of the sheet-like members includes a first longitudinal end portion, a second longitudinal end portion, and a longitudinal middle portion through which the first longitudinal end portion and the second longitudinal end portion are connected to each other, and
the first longitudinal end portion is in contact with a first side of the surrounding body, the second longitudinal end portion is in contact with a second side of the surrounding body, and the first side and the second side are opposite to each other across the longitudinal middle portion.

4. The sealing material composition according to claim 2, wherein:
each of the sheet-like members includes a first longitudinal end portion, a second longitudinal end portion, and a longitudinal middle portion through which the first longitudinal end portion and the second longitudinal end portion are connected to each other, and
the first longitudinal end portion is in contact with a first side of the surrounding body, the second longitudinal end portion is in contact with a second side of the surrounding body, and the first side and the second side are opposite to each other across the longitudinal middle portion.

5. The sealing material composition according to claim 3, wherein the first longitudinal end portion and the second longitudinal end portion of each of the sheet-like members are elongated in a direction which is inclined with respect to the longitudinal direction of the surrounding body.

6. The sealing material composition according to claim 4, wherein the first longitudinal end portion and the second longitudinal end portion of each of the sheet-like members are elongated in a direction which is inclined with respect to the longitudinal direction of the surrounding body.

7. The sealing material composition according to claim 3, wherein:
the longitudinal middle portion of each of the sheet-like members is disposed to be inclined with respect to the longitudinal direction of the surrounding body, and
at least one of the first longitudinal end portion and the second longitudinal end portion of each of the sheet-like members is disposed along the longitudinal direction of the surrounding body.

8. The sealing material composition according to claim 4, wherein:
the longitudinal middle portion of each of the sheet-like members is disposed to be inclined with respect to the longitudinal direction of the surrounding body, and
at least one of the first longitudinal end portion and the second longitudinal end portion of each of the sheet-like members is disposed along the longitudinal direction of the surrounding body.

9. The sealing material composition according to claim 5, wherein:
the longitudinal middle portion of each of the sheet-like members is disposed to be inclined with respect to the longitudinal direction of the surrounding body, and
at least one of the first longitudinal end portion and the second longitudinal end portion of each of the sheet-like members is disposed along the longitudinal direction of the surrounding body.

10. The sealing material composition according to claim 6, wherein:
the longitudinal middle portion of each of the sheet-like members is disposed to be inclined with respect to the longitudinal direction of the surrounding body, and
at least one of the first longitudinal end portion and the second longitudinal end portion of each of the sheet-like members is disposed along the longitudinal direction of the surrounding body.

11. A gland packing, comprising:
the sealing material composition according to claim 1.

12. The gland packing according to claim 11, further comprising:
an inner core member in which the sealing material composition is used; and
yarns disposed in a periphery of the inner core member to be twisted or braided with each other.

13. The gland packing according to claim 12, wherein
the surrounding body of the sealing material composition is formed by metal wires, and
each of the yarns includes an expanded graphite material and a reinforcing material which reinforces the expanded graphite material.

14. The gland packing according to claim 12, wherein the inner core member is 5 mass % or more and 70 mass % or less based on a total mass of the gland packing.

15. The gland packing according to claim 13, wherein the inner core member is 5 mass % or more and 70 mass % or less based on a total mass of the gland packing.

* * * * *